(12) United States Patent
Terada et al.

(10) Patent No.: US 7,616,152 B2
(45) Date of Patent: *Nov. 10, 2009

(54) RELATIVE POSITION MEASUREMENT METHOD AND RELATIVE POSITION MEASUREMENT SYSTEM USING SATELLITES

(75) Inventors: Yukihiro Terada, Osaka (JP); Keiji Ito, Osaka (JP); Takenori Abe, Osaka (JP); Takashi Fujita, Osaka (JP)

(73) Assignee: Hitachi Zosen Corporation, Osaka-shi, Osaka (JP)

( * ) Notice: Subject to any disclaimer, the term of this patent is extended or adjusted under 35 U.S.C. 154(b) by 138 days.

This patent is subject to a terminal disclaimer.

(21) Appl. No.: 11/666,254

(22) PCT Filed: Oct. 29, 2004

(86) PCT No.: PCT/JP2004/016112

§ 371 (c)(1),
(2), (4) Date: Apr. 25, 2007

(87) PCT Pub. No.: WO2006/046298

PCT Pub. Date: May 4, 2006

(65) Prior Publication Data

US 2008/0284645 A1 Nov. 20, 2008

(51) Int. Cl.
*G01S 5/14* (2006.01)
*G01C 21/30* (2006.01)
(52) U.S. Cl. .................. 342/357.08; 342/357.03; 701/208
(58) Field of Classification Search .............. 342/357.01–357.12; 701/208
See application file for complete search history.

(56) References Cited

U.S. PATENT DOCUMENTS

| 6,434,509 | B1 | 8/2002 | Tsuchiya et al. | 702/158 |
| 7,231,295 | B2 * | 6/2007 | Pickett et al. | 701/208 |
| 7,248,211 | B2 * | 7/2007 | Hatch et al. | 342/357.03 |
| 7,482,974 | B2 * | 1/2009 | Ogawa et al. | 342/357.08 |

FOREIGN PATENT DOCUMENTS

JP 9-61509 3/1997

(Continued)

*Primary Examiner*—Thomas H Tarcza
*Assistant Examiner*—Harry Liu
(74) *Attorney, Agent, or Firm*—Kusner & Jaffe

(57) ABSTRACT

A positioning system wherein radio waves from a GPS satellite (4) are received by a reference station (1), the absolute position of which is already known, and a plurality of mobile stations (3) to perform relative positioning among particular stations, thereby determining the positions of the mobile stations (3). At least one of the mobile stations (3) is disposed such that a baseline limit length allowing relative positioning relative to the reference station (1) is exceeded, and the intervals between particular mobile stations (3) are shorter than the baseline limit length allowing relative positioning. Each of the stations (1, 3) is equipped with a GPS receiver (11, 21) that receives the radio waves from the GPS satellite (4), and further equipped with a wireless communication apparatus (12, 22) that transmits/receives data to/from a particular station. There are provided a relative position calculation part (32) for calculating the relative position between the particular stations; and an absolute position calculation part (33) for determining, based on an absolute position of one station that performs a relative positioning, an absolute position of the other station.

5 Claims, 8 Drawing Sheets

FOREIGN PATENT DOCUMENTS

| | | |
|---|---|---|
| JP | 11-063984 | 3/1999 |
| JP | 2001-174259 | 6/2001 |
| JP | 2001-281323 | 10/2001 |
| JP | 2002-181917 | 6/2002 |
| JP | 2004-144622 | 5/2004 |
| JP | 2004-286626 | 10/2004 |
| JP | 2004-301598 | 10/2004 |

* cited by examiner

RELATIVE POSITION MEASUREMENT METHOD AND RELATIVE POSITION MEASUREMENT SYSTEM USING SATELLITES

FIELD OF THE INVENTION

The present invention relates to a relative position measurement method and relative position measurement system for using radio waves from a plurality of satellites and detecting a three-dimensional position by relative position measurement.

BACKGROUND OF THE INVENTION

As a satellite position measurement technology for receiving and analyzing radio waves from a plurality of satellites and detecting a position of a receiver (hereafter called "mobile station"), a single position measurement system for measuring a position by a solo mobile station even if the measurement error is large, and a relative position measurement system for accurately determining the position of a mobile station using the correction data from a reference station of which position is known, are available.

In the relative position measurement system, the position measurement accuracy is restricted by the linear distance between receivers, which is the so called "base line length".

For example, in the case of a relative position measurement system which measures the position independently using the C/A code of GPS (Global Positioning System) and correcting the position using correction data, the limit of the base line length, when the uncertainty of the orbit information of the satellite and the error due to the ionosphere and atmosphere or the like are approximately the same for each receiver, is about 100 km or less, and an error can be canceled within this range, so an improvement of the position measurement accuracy in the relative position measurement system can be expected.

On the other hand, in the case of a system which analyzes the base line using a carrier phase so as to improve the position measurement accuracy, the limit of the base line is short, about 10 km or less, but the position measurement accuracy improves dramatically since a carrier phase, which is sufficiently shorter than the C/A code, is used [e.g. see the new edition of GPS—Precision Positioning System by Satellites, (issued by Japan Survey Association)].

Any of the above-mentioned relative position measurement systems, however, can be used in the range of the base line limit length from the reference station and in the area where the reference station is not organized, the relative position measurement cannot be used no matter where the mobile station is located, whether on land, ocean or in the sky, so position cannot be measured accurately.

SUMMARY OF THE INVENTION

An advantage of the present invention is a relative position measurement method and a relative position measurement system using satellites that can use relative position measurement, even for a mobile station located outside the range of the base length that allows relative position measurement.

The relative position measurement method using satellites according to the present invention is a position measurement method for forming a relative network for performing a relative position measurement between predetermined stations by receiving radio waves from satellites by a reference station and a plurality of mobile stations, and measuring a reference relative position, which is a relative position of each mobile station viewed from the reference station, wherein at least one of the mobile stations is disposed so as to exceed a base line limit length that allows relative position measurement with the reference station, and a space between predetermined mobile stations is set to be a base line limit length that allows relative position measurement or less than the base line limit length, the relative position measurement method comprising: a reference relative position computing step of computing a reference relative position between the reference station and the predetermined mobile station; an inter-mobile station relative position computing step of computing an inter-mobile station relative position, which is a relative position between the predetermined stations; and a conversion step of converting the inter-mobile station relative position between a mobile station for which the reference relative position is determined and a mobile station that performs relative position measurement into a reference relative position using a reference relative position of a remote station.

The relative position measurement system of the present invention is a position measurement system for forming a relative position measurement network for performing a relative position measurement between predetermined stations by receiving radio waves from satellites by a reference station and a plurality of mobile stations, and measuring a reference relative position, which is a relative position of each mobile station reviewed from the reference station, wherein at least one of the mobile stations is disposed so as to exceed a base line limit length that allows relative position measurement with the reference station, and a space between predetermined mobile stations is set to be a base line limit length that allows relative position measurement or less than the base line limit length, a satellite position measurement device for receiving radio waves from satellites is installed in each of the stations, a radio communication device for transmitting and receiving data to/from a predetermined station is installed in each of the stations, and the relative position measurement system is provided with a relative position computing section for computing a relative position between the predetermined stations, and a reference relative position computing section for determining a reference relative position of another mobile station based on a reference relative position of one station that performs the relative position measurement.

It is preferable that the reference relative position computing section in the relative position measurement system is disposed in the reference station, and the reference relative position of the mobile station is sequentially determined.

It is also preferable that the reference relative position computing section for computing each reference relative position is disposed in each mobile station in the relative position measurement system.

It is also preferable that the relative position measurement in the relative position measurement system is performed using a carrier phase.

According to the relative position measurement method and relative position measurement system, a network which sequentially places mobile stations from a reference station with a predetermined space so as to be less than a base line limit length that allows relative position measurement and performs relative position measurement continuously, is formed, and the relative position between each station is determined, and also the reference relative position of each mobile station from the reference station is sequentially determined using the reference relative position of a mobile station which performs relative position measurement with the reference station, so the relative position of a mobile station which is distant from the reference station, more than the base line limit length that allows relative position measurement, can be more accurately determined by the relative position measurement via the mobile station disposed there between.

For example, by disposing each mobile station on a floating body located on a sea surface in a sea area distant from the reference station on the land, the coming of a tsunami can be known at a sea area distant from the coast line based on the time-based displacement of the position of each mobile station, and tsunami related damage can be minimized.

DETAILED DESCRIPTION OF PREFERRED EMBODIMENTS

A relative position measurement system and relative position measurement method using satellites according to the present invention will now be described.

In the present embodiment, a real-time kinematic system using GPS (Global Positioning System) satellites that is used as the relative position measurement system using satellites, and a case of measuring an absolute position with setting a reference station at a known absolute position when a relative position of a floating body moored on the sea surface for detecting the displacement of the sea level, viewed from the reference station, is determined as the position measurement target will be described.

Embodiment 1

The relative position measurement system and relative position measurement method using satellites according to Embodiment 1 will now be described with reference to FIG. 1 to FIG. 5.

Figure 1:
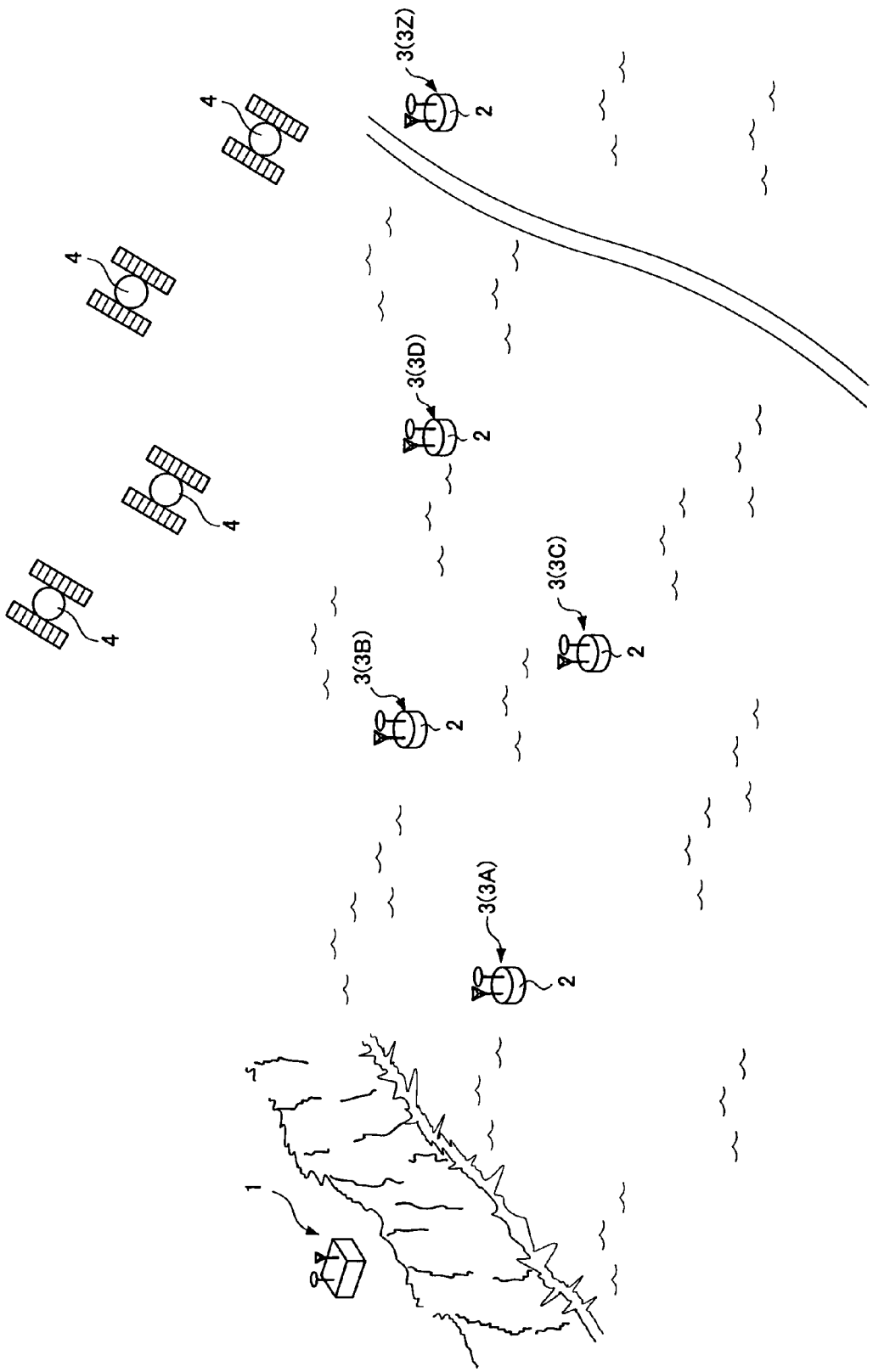
FIG. 1 is a perspective view depicting an entire configuration of the relative position measurement system according to Embodiment 1 of the present invention.

As FIG. 1 shows, this relative position measurement system comprises a reference station 1 fixed on a land of which the absolute three-dimensional position is known, and a plurality of mobile stations 3 installed on a plurality of floating bodies (buoy) 2 sequentially moored on a sea surface with a predetermined space from the center of the reference station 1 to offshore in a sea area, where the displacement of sea level viewed from the reference station 1 is to be detected, and each station 1 and 3 has a function for determining a relative position of each mobile station 3 by receiving radio waves from GPS satellites 4 and using the real-time kinematic system (which uses a carrier phase, and is hereafter called the "RTK system").

For each mobile station 3, one closest to the reference station 1 is called the "first mobile station 3A", and the one second-closest to the reference station 1 is sequentially called the "second mobile station 3B", then, third mobile station 3C, . . . "and the one most distant from the reference station 1 is called the "nth mobile station 3Z".

As mentioned above, each station is disposed with a predetermined space, and, for example, the space between the reference station 1 and the first mobile station 3A, between the first mobile station 3A and the second mobile station 3B, between the second mobile station 3B and the third mobile station 3C, . . . and between the n−1th mobile station 3Y and the nth mobile station 3Z are set to be the base line length, which allows position measurement in an RTK system (hereafter called the "base line limit length", which is 10 km, for example) or less than the base line limit length, and a relative position measurement network is formed among the stations with the reference station to perform the relative position measurement upstream, and at least the mobile station 3, the most distant from the reference station 1, is installed on a floating body 2 at a position which exceeds the base line limit length from the reference station 1. And for certain the space between each station may be a same length or a different length, as long as it is the base line limit length which allows position measurement in an RTK system or less than the base line limit length.

Figure 2:
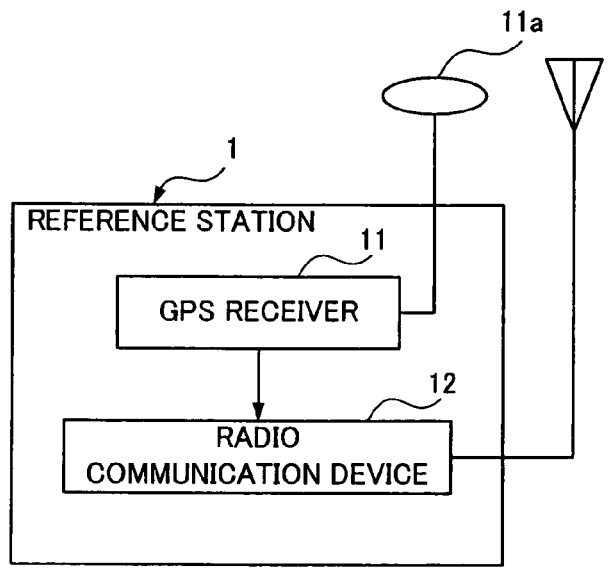
FIG. 2 is a block diagram depicting a general configuration of a reference station in this relative position measurement system.

As shown in FIG. 2, the reference station 1 comprises a GPS receiver (an example of a satellite position measurement device) 11 for receiving radio waves from the GPS satellite 4 via the antenna 11a and measuring the satellite data for position measurement, and a radio communication device (further comprises a transmitter and receiver) 12 which transmits/receives various data, including the satellite data for position measurement measured by the GPS receiver 11, with another mobile station 3.

Figure 3:
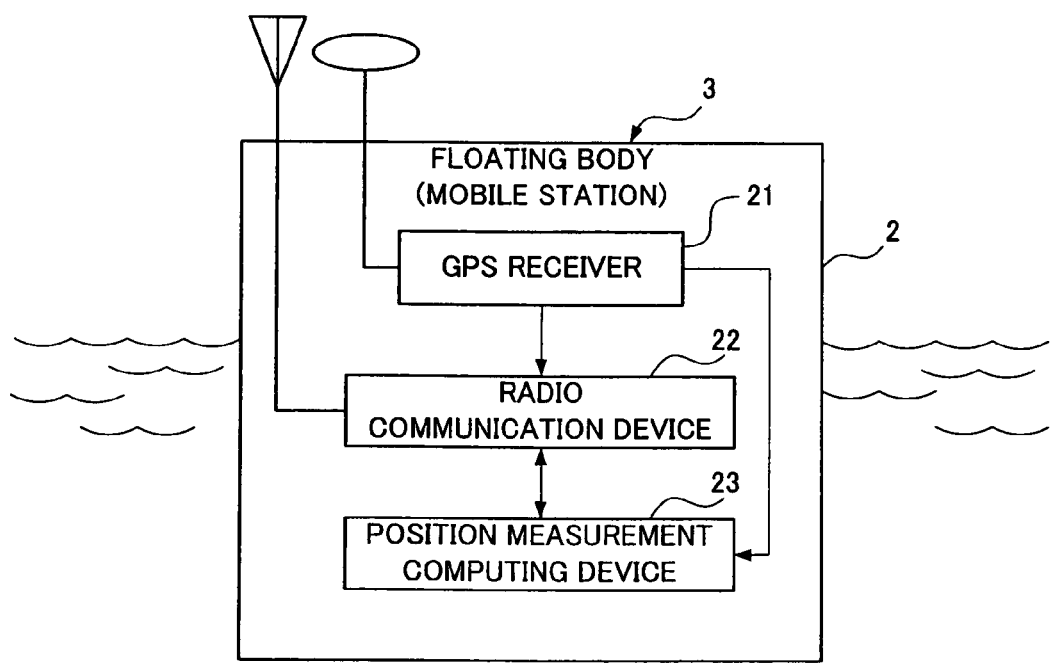
FIG. 3 is a block diagram depicting a general configuration of a mobile station in this relative position measurement system.
Figure 4:
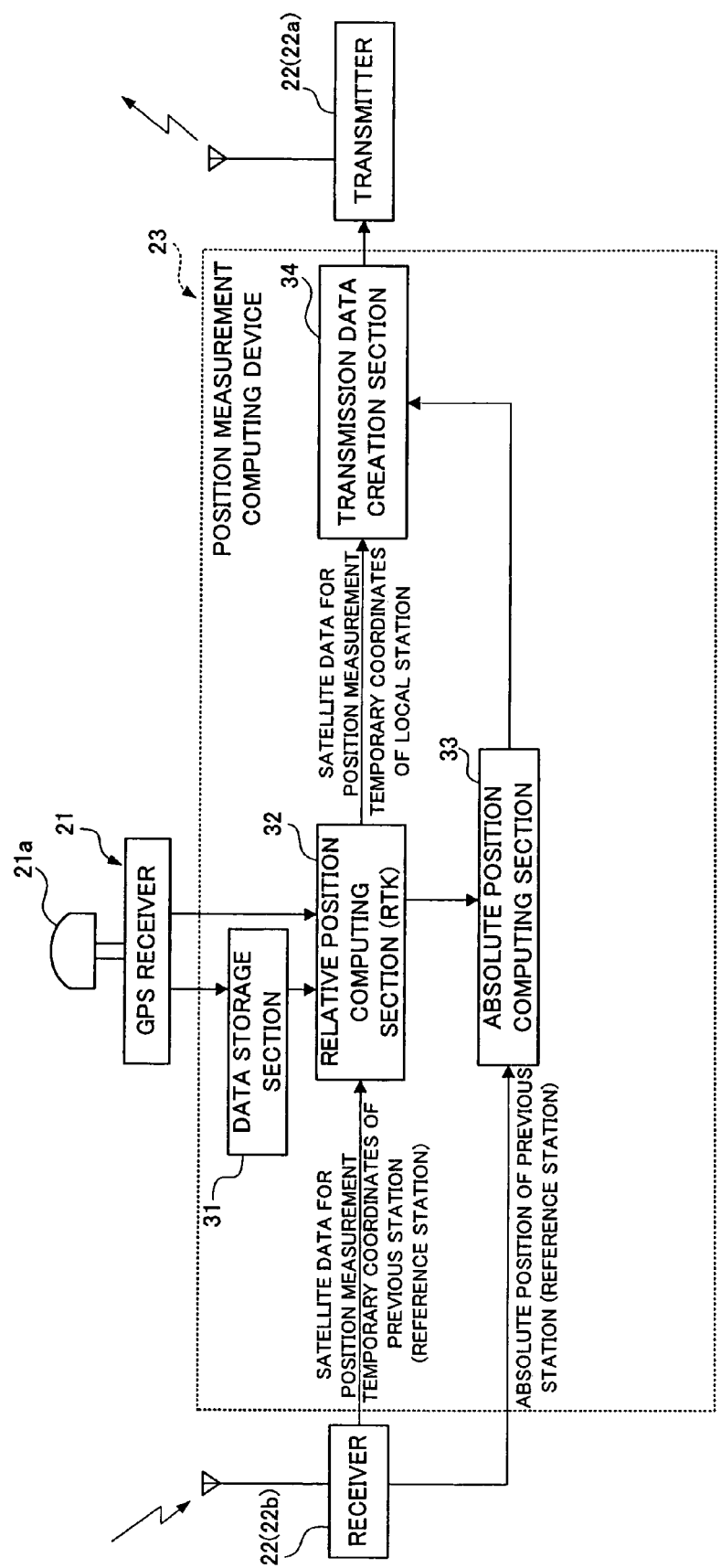
FIG. 4 is a block diagram depicting a general configuration of a position measurement computing device installed in the mobile station.

As shown in FIG. 3, each mobile station 3 comprises a GPS receiver (an example of a satellite position measurement device) 21 for receiving radio waves from the GPS satellite 4 and measuring the satellite data for position measurement, a radio communication device (further comprises a transmitter 22a and receiver 22b, as shown in FIG. 4) 22, which transmits/receives data with other stations 1 and 3, and a position measurement computing device 23 for receiving data from the other stations 1 and 3 and performing relative position measurement using an RTK system based on the data of the same time in the local station, that is, determining the relative displacement of another station from one station.

Now the position measurement computing device 23 installed in the mobile station 3 will be described in detail.

As shown in FIG. 4, the position measurement computing device 23 comprises a data storage section 31 for storing satellite data for position measurement measured by the GPS receiver 21 (including a carrier phase value, distance between satellite and antenna of the receiver (pseudo-distance), orbit information of the satellite, time series data (GPS time) used for the satellite position measurement system, and, for example, elevation angle and azimuth of the satellites during receiving), a relative position computing section 32 for inputting the satellite data for position measurement obtained in the GPS receiver 21, satellite data for position measurement from the reference station 1 or previous mobile station (mobile station closer to the reference station in the network (upstream side), hereafter called "previous station") 3, and a temporary fixed position (hereafter called "temporary coordinates") of the previous station, via the receiver 22b, and computing the relative position from the previous station using the RTK system, an absolute position computing section 33 for inputting the relative position determined by the relative position computing section 32 and the absolute position of the previous station and computing the absolute position of this mobile station 3, and a transmission data creation section 34 for inputting the satellite data for position measurement of the mobile station 3 stored in the data storage section 31, that is, of the local station, the temporary coordinates of the location station and the absolute position determined by the absolute position computing section 33, and creating the transmission data to be sent to the next mobile station 3. For certain the transmission data created by the transmission data creation section 34 is sent to the next mobile station 3 via the transmitter 22a. Among the satellite data for position measurement, the orbit information, elevation angle and azimuth, for example, are received by the two stations which perform relative position measurement respectively, so if the data is obtained only by the GPS receiver 21 of one station, the data may be transferred to the other station and used, since both the elevation angle and azimuth are approximately the same for these two stations.

The data used for relative position measurement is acquired from the data storage section if necessary.

In the above configuration, if an absolute position is not provided to the reference station 1, the absolute position computing section 33 becomes the reference relative position computing section. In this case, if the previous station is a mobile station, the reference relative position is input from the previous station to this reference relative position computing section.

Figure 5:
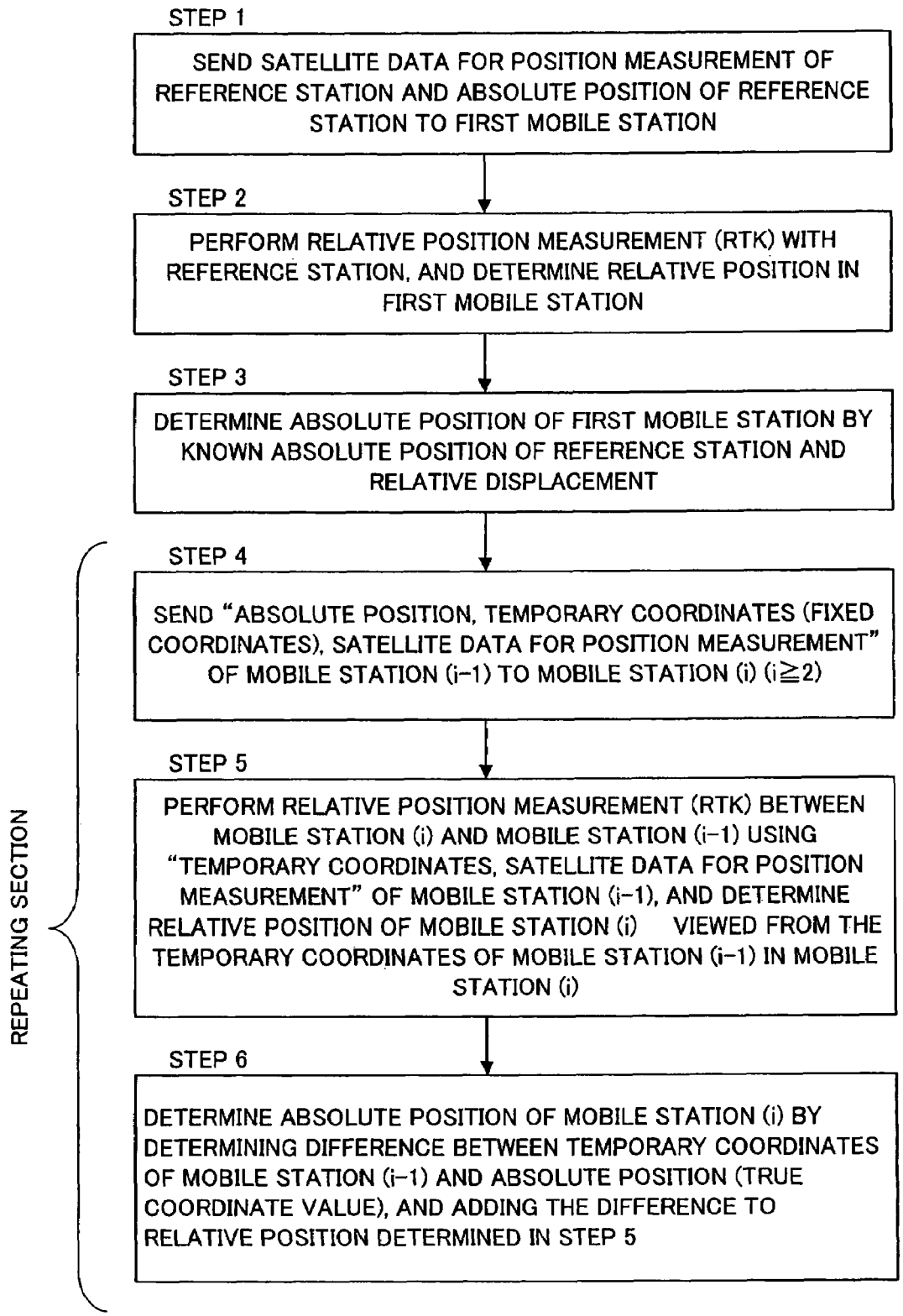
FIG. 5 is a flow chart depicting the relative position measurement method in the relative position measurement system.

Now a method for measuring the absolute position of each mobile station by determining a relative position between each station in this relative position measurement system and measuring a displacement of the sea level will be described with reference to the flow chart in FIG. 5.

First the satellite data for position measurement, in which the temporary coordinates and the absolute position of the reference station 1 on the land are sent to the first mobile station 3A on the sea level (step 1).

Then in the first mobile station 3, the relative position (reference relative position) viewed from the reference station in the temporary coordinates is determined between the reference station 1 and the first mobile station 3A using the relative position measurement based on the RTK system (step 2: reference relative position computing step).

Then the absolute position of the first mobile station 3A is determined using the absolute position (absolute coordinates) and relative position of the reference station 1 (step 3).

Then the absolute position and temporary coordinates (fixed coordinates) of the first mobile station 3A and the satellite data for position measurement are sent to the second mobile station 3B.

Then in the second mobile station 3B, the relative position measurement based on the RTK system is performed between the first mobile station 3A and the second mobile station 3B using the temporary coordinates and the satellite data for position measurement, and the relative position (inter-mobile station relative position) of the second mobile station 3B viewed from the first mobile station 3A is determined (step 5: inter-mobile station relative position computing step).

Then the difference between the temporary coordinates of the first mobile station 3A and the absolute position thereof (true coordinate value) is determined and is added to the inter-mobile station relative position determined in step 5, and the absolute position of the second mobile station 3B is determined (step 6: displacement step).

When the absolute position of the second mobile station 3B is determined, the above mentioned steps 4 to 6 are repeated, and the absolute position of the third mobile station 3C is determined, and this procedure is repeated until the absolute position of the nth mobile station 3Z, which is the most distant from the reference station, is determined. In this repeating section (steps 4 to 6), the previous station is indicated as (i−1), and the mobile station, for which absolute position is determined based on the relative position measurement is indicated as (i).

Therefore once the absolute position of each mobile station 3 is determined, this means that the displacement of the floating body 2, that is, the displacement of the sea level at every predetermined cycle, is measured, and the waves can be accurately measured by the water level fluctuation of the sea surface, and by removing the wave component and the tidal component from the displacement of the sea level, a tsunami generated by an earthquake, for example, can be accurately measured.

In the above mentioned method, the absolute position of the reference station is provided, and is converted into the absolution position of the second mobile station in step 6, but if the absolute position is not provided, the difference between the temporary coordinates of the first mobile station 3A and the reference relative position thereof is determined, and the reference relative position of the second reference station 3B is determined. To detect waves and tsunami, it is not always necessary to determine the absolute position.

In brief, the relative position measurement method of the present invention is a position measurement method for forming a relative network for receiving radio waves from satellites by a reference station and a plurality of mobile stations, and performing relative position measurement between predetermined stations, and measuring a reference relative position, which is a relative position of each mobile station viewed from the reference station, wherein at least one of the mobile stations is disposed so as to exceed a base line limit length which allows relative position measurement with the reference station, and a space between predetermined mobile stations is set to be the base line limit length which allows the relative position measurement or less than the base line limit length, and this position measurement method has a reference relative position computing step for computing a reference relative position between the reference station and a predetermined mobile station, an inter-mobile station relative position computing step for computing an inter-mobile station relative position, which is a relative position between the predetermined stations (corresponding to step 2), and a conversion step of converting the inter-mobile station relative position of the mobile station for which the reference relative position is determined and the mobile station which performs the relative position measurement, into the reference relative position using the reference relative position of the remote station (corresponding to step 6).

In this way, the reference station 1, of which absolute position is known, is disposed on land, and the mobile stations 3 are sequentially disposed on the sea surface from the reference station 1 with a predetermined space, so as to be the base line limit length which allows relative position measurement based on the RTK system or less than the base line limit length, and the relative position between each station is determined by the RTK system, and using this relative position, the absolute position of each mobile station with respect to the reference station is determined, so the absolute position of the mobile station 3, which is distant from the reference station 1 more than the base line limit length which allows relative position measurement, can be accurately determined via the mobile stations 3 disposes therebetween based on the RTK system.

Therefore by disposing each mobile station on a floating body on the sea surface in a sea area distant from the reference station, the existence of a tsunami can be known well before reaching shore, so tsunami related damage can be minimized.

Embodiment 2

Now the relative position measurement method and relative position measurement system using satellites according to Embodiment 2 will now be described with reference to FIG. 6 and FIG. 7.

In Embodiment 1, the temporary coordinates are used when relative position measurement is performed between each station, but in Embodiment 2, the absolute positions of the reference station and the previous station are used, and therefore in the following description, only this will be focused on and described, and composing elements the same as Embodiment 1 will be denoted with the same reference numbers, for which description will be omitted.

Figure 6:
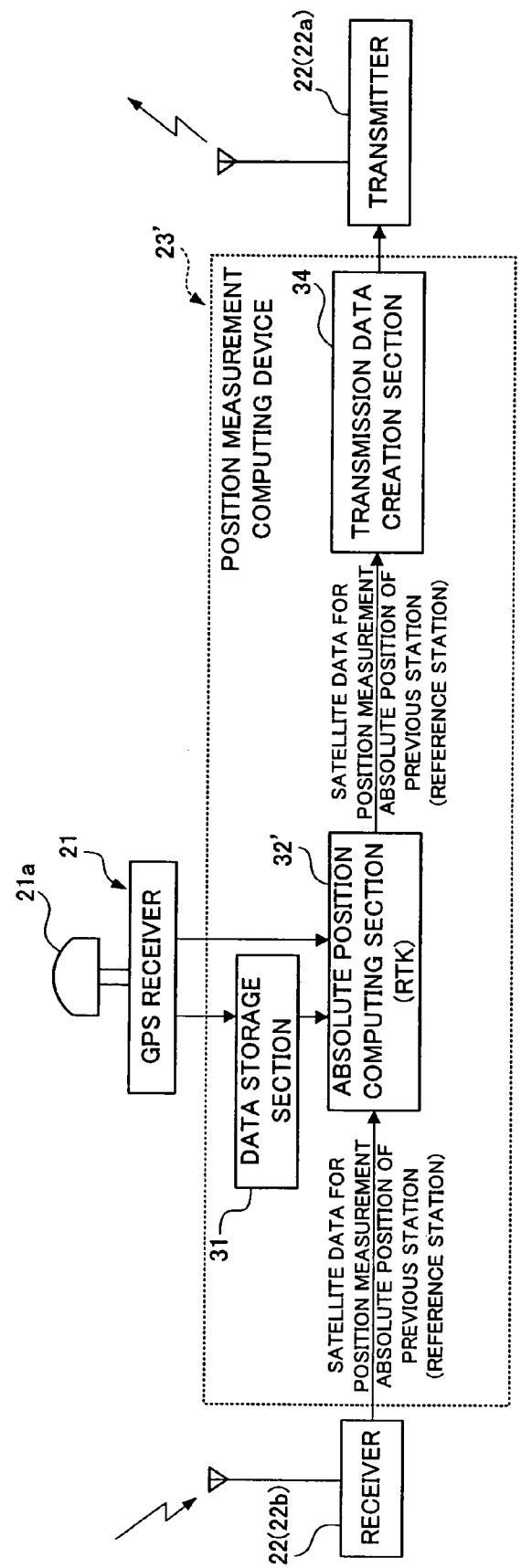
FIG. 6 is a block diagram depicting a general configuration of the position measurement computing device installed in a mobile station of the relative position measurement system according to Embodiment 2 of the present invention.
Figure 7:
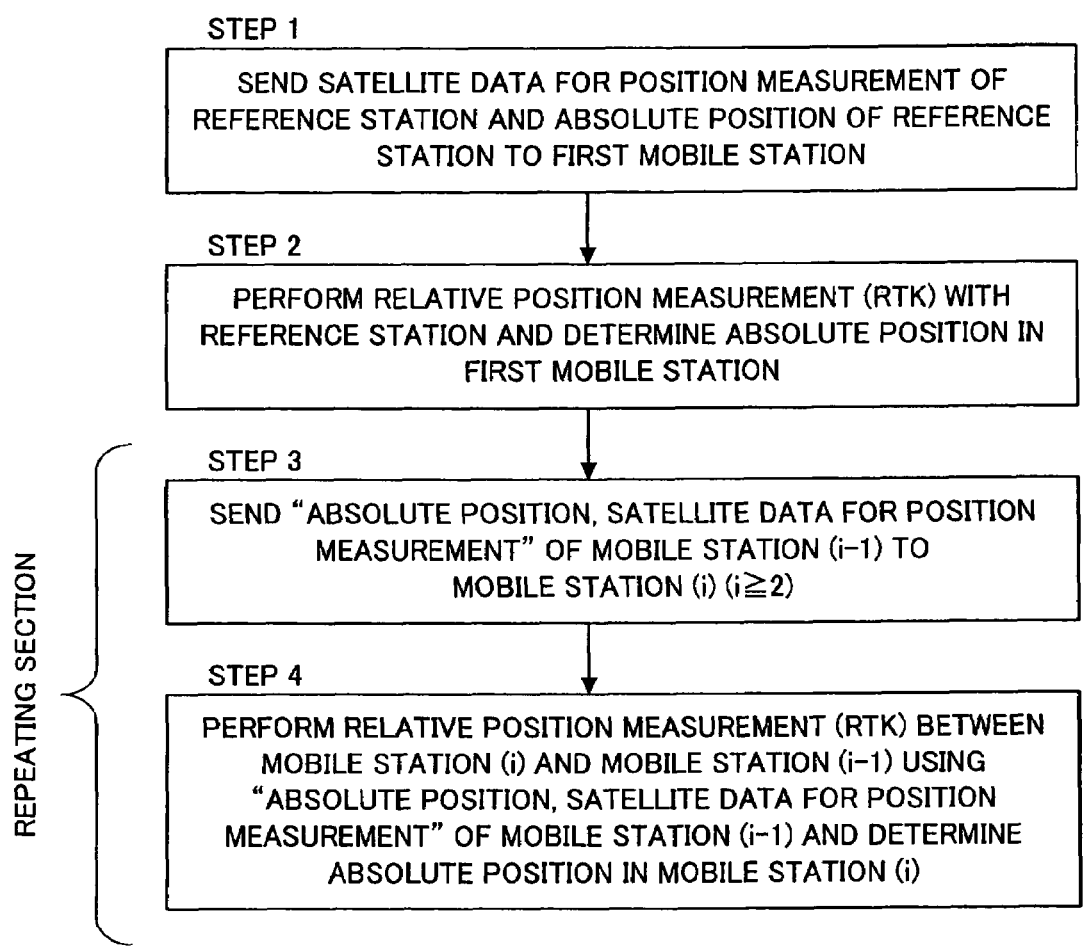
FIG. 7 is a flow chart depicting the relative position measurement method in the relative position measurement system.

As FIG. 6 shows, in the position measurement computing device 23' disposed in each mobile station 3, the satellite data for position measurement from the previous station and absolute position of the previous station are input to the absolute position computing section 32', and the absolute position of the target mobile station 3 of position measurement is directly determined in the absolute position computing section 32'. Therefore the absolute position computing section 32' of Embodiment 2 is the relative position computing section 32 of Embodiment 1, in which the function of the absolute position computing section 33 is integrated.

A method for measuring the absolute position of each mobile station 3 in this case will now be briefly described with reference to the flow chart in FIG. 7.

First the satellite data for position measurement of the reference station 1 on land and the absolute position thereof are sent to the first mobile station 3A on the sea surface (step 1).

Then in the first mobile station 3, the relative position measurement is performed between the reference station 1 and the first mobile station 3A based on the RTK system, and the relative position is determined (step 2).

Then the absolute position of the first mobile station 3A and the satellite data for position measurement are sent to the second mobile station 3B (step 3).

Then in the second mobile station 3B, the relative position measurement based on the RTK system is performed between the first mobile station 3A and the second mobile station 3B using the satellite data for position measurement, and the absolute position is determined (step 4).

When the absolute position of the second mobile station 3B is determined, the above mentioned steps 3 to 4 are repeated, and the absolute position of the third mobile station 3C is determined, and this procedure is repeated until the absolute position of the nth mobile station 3Z, which is the most distant from the reference station is determined. In this repeating section (steps 3 to 4), the previous station is indicated as (i−1), and the mobile station, for which absolute position is determined based on the relative position measurement, is indicated as (i).

Therefore in Embodiment 2 as well, an effect the same as Embodiment 1 is obtained.

In each of the above embodiments, the position measurement computing device is disposed in each mobile station, and the absolute position of each mobile station is determined, but these absolute positions are transmitted along with a station number to an observatory (may also be used as a reference station) on land by the transmitter 22a, and centrally controlled there.

On the other hand, the position measurement computing device may be disposed in the reference station, for example, so that the satellite data for position measurement, measured in each mobile station, is transmitted to and stored in the reference station, and the absolute position of each mobile station may be determined by the position measurement computing device of the reference station.

In other words, the inter-mobile station transmission data is transmitted to the reference station, and the data of each mobile station is stored in the reference station, and the absolute position of each mobile station is determined in the absolute position computing section using this data.

Figure 8:
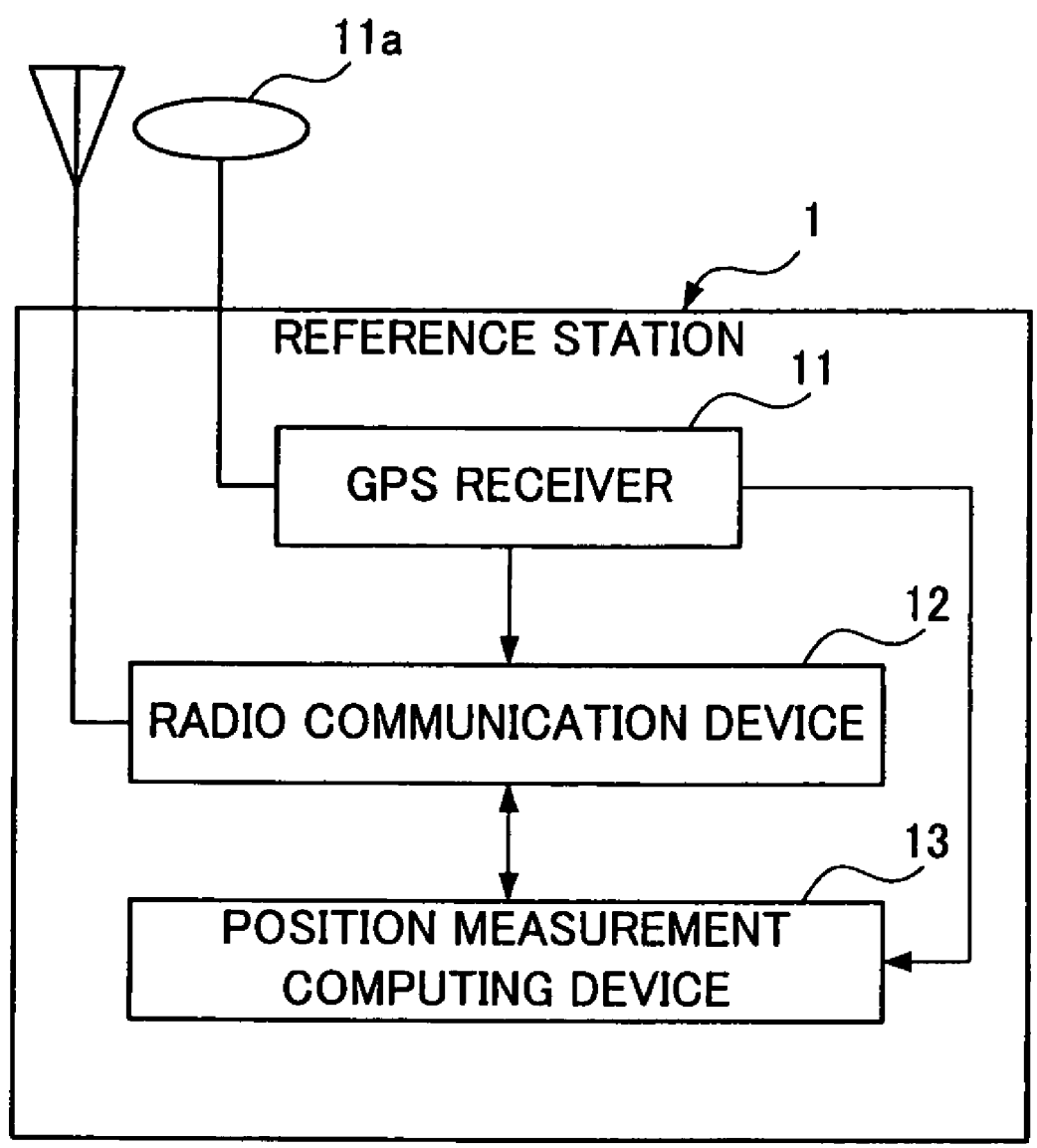
FIG. 8 is a block diagram depicting a general configuration of a reference station according to a variant form of the relative position measurement system of each embodiment.
Figure 9:
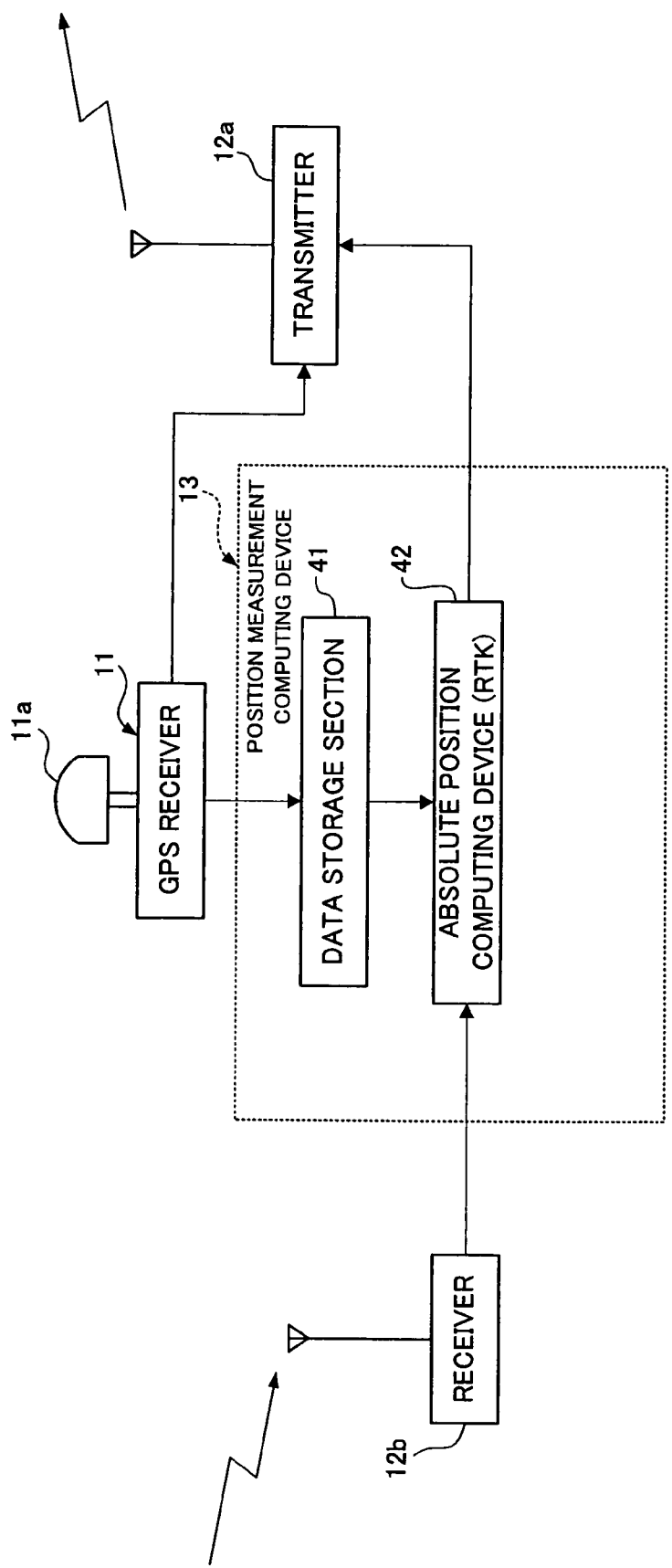
FIG. 9 is a block diagram depicting a general configuration of a relative position measurement computing device installed in the reference station according to a variant form of the relative position measurement system of each embodiment.

In this case, the reference station 1 comprises a position measurement computing device 13, as shown in FIG. 8, and the position measurement computing device 13 further comprises a data storage section 41 for storing at least satellite data for position measurement from the GPS receiver 11 and the satellite data for position measurement received by each mobile station 3 via the receiver 12b of the radio communication device 12, and an absolute position computing section 42 for inputting the satellite data for position measurement stored in this data storage section 41, and computing the absolute position of each mobile station 3 with respect to the reference station 1, as shown in FIG. 9.

In the description of the above embodiments, data is transmitted/received between each station by the radio communication device, but if communication by ground waves cannot be performed due to visual limitation, data can be transmitted/received via the communication satellite.

Also in the above embodiments, the reference station is disposed on land, but also may be disposed on a floating body floating on the sea surface.

Also in the description of the above embodiments, the reference station is disposed on land and the mobile stations are disposed on the sea surface so as to measure waves and tsunami, but if both the reference station and mobile stations are disposed on land, the relative position measurement system can also be used as a seismograph, for example.

Also in the above embodiments, satellite measurement based on GPS was used as an example, but the present invention can also be applied to a satellite position measurement system based on the same principle, or which will appear in the future.

INDUSTRIAL APPLICABILITY

According to the relative position measurement method and relative position measurement system of the present invention, accurate position measurement is possible using a relative position measurement based on a real-time kinematic system, even for a mobile station installed at a position exceeding the base line limit length which allows relative position measurement from the reference station, and by mooring a floating body, on which a mobile station is installed, in a sea area quite distant from land, for example, a tsunami can be measured offshore and its coming can be forecasted, and the tsunami related damage can be minimized. In some cases, the relative position measurement system can also be used as a seismograph.

The invention claimed is:

1. A relative position measurement method for forming a relative network for performing a relative position measurement between predetermined stations by receiving radio waves from satellites by a reference station and a plurality of mobile stations, and measuring a reference relative position, which is a relative position of each mobile station viewed from the reference station, wherein at least one of said mobile stations is disposed so as to exceed a base line limit length that allows relative position measurement with the reference station, and a space between predetermined mobile stations is set to be a base line limit length that allows relative position measurement or set to be less than the base line limit length, the relative position measurement method comprising:

a reference relative position computing step of computing a reference relative position between the reference station and the predetermined mobile station;

an inter-mobile station relative position computing step of computing an inter-mobile station relative position, which is a relative position between said predetermined stations; and a conversion step of converting the inter-mobile station relative position between a mobile station for which the reference relative position is determined and a mobile station that performs relative position measurement, into a reference relative position using a reference relative position of a remote station.

2. A relative position measurement system for forming a relative position measurement network for performing a relative position measurement between predetermined stations by receiving radio waves from satellites by a reference station and a plurality of mobile stations, and measuring a reference relative position, which is a relative position of each mobile station viewed from the reference station, wherein at least one of said mobile stations is disposed so as to exceed a base line limit length that allows relative position measurement with the reference station, and a space between predetermined mobile stations is set to be a base line limit length that allows relative position measurement or set to be less than the base line limit length, a satellite position measurement device for receiving radio waves from satellites is installed in each of said stations, a radio communication device for transmitting and receiving data to/from a predetermined station is installed in each of said stations, and the relative position measurement system is provided with a relative position computing section for computing a relative position between said predetermined stations, and a reference relative position computing section for determining a reference relative position of another mobile station based on a reference relative position of one station that performs the relative position measurement.

3. The relative position measurement system using satellites according to claim 2, wherein the reference relative position computing section is disposed in the reference station, and the reference relative position of the mobile station is sequentially determined.

4. The relative position measurement system using satellites according to claim 2, wherein the reference relative position computing section for computing each reference relative position is disposed in each mobile station.

5. The relative position measurement system using satellites according to claim 2, wherein the relative position measurement is performed using a carrier phase.

* * * * *